United States Patent
Lause et al.

Patent Number: 5,466,317
Date of Patent: Nov. 14, 1995

[54] LAMINATED BUILDING PANEL AND METHOD FOR ITS PRODUCTION

[75] Inventors: Herb Lause; Sylvia Moore, both of Sidney, Ohio; Clif Seltzer, Evansville, Ind.; Cliff Taylor; Dan King, both of Sidney, Ohio

[73] Assignee: Aluminum Company of America, Pittsburgh, Pa.

[21] Appl. No.: 177,437

[22] Filed: Jan. 5, 1994

Related U.S. Application Data

[63] Continuation-in-part of Ser. No. 52,951, Apr. 23, 1993.

[51] Int. Cl.[6] ............................ B32B 5/18; B32B 31/14; B29C 47/00; D21B 1/04
[52] U.S. Cl. ................ 156/79; 156/244.11; 156/244.12; 156/244.27; 264/69; 264/115; 264/210.2; 264/257; 428/288; 428/474.4
[58] Field of Search ..................... 428/288, 474; 52/309.7, 309.11, 310, 583, 192; 264/69, 7, 115, 210.2, 257; 156/79, 244.11, 244.12, 244.27

[56] References Cited

U.S. PATENT DOCUMENTS

| | | | |
|---|---|---|---|
| 4,073,997 | 2/1978 | Richards et al. | 428/285 |
| 4,078,348 | 3/1978 | Rothman | 52/310 |
| 4,308,702 | 1/1982 | Rejewski | 428/53 |
| 4,388,366 | 6/1983 | Rosato et al. | 428/285 |
| 4,459,334 | 8/1982 | Blanpied et al. | 428/285 |
| 4,463,043 | 7/1982 | Reeves et al. | 428/68 |
| 4,536,360 | 8/1985 | Rahrig | 428/288 |
| 4,753,837 | 6/1988 | Hanusa | 428/139 |
| 4,764,420 | 8/1988 | Gluck et al. | 428/921 |
| 4,788,088 | 11/1988 | Kohl | 428/35.6 |
| 5,030,676 | 7/1991 | Wallen | 524/182 |
| 5,070,668 | 12/1991 | Lieberman | 428/285 |
| 5,098,778 | 3/1992 | Minnick | 428/285 |

*Primary Examiner*—George F. Lesmes
*Assistant Examiner*—Kathryne E. Shelborne
*Attorney, Agent, or Firm*—David W. Brownlee

[57] ABSTRACT

A building panel and method of forming it are disclosed in which the panel includes inner and outer polymer facing sheets and a rigid foam core with the facing sheets joined securely to the core by glass fibers embedded in the facing sheets and projecting from them into the core.

15 Claims, 3 Drawing Sheets

LAMINATED BUILDING PANEL AND METHOD FOR ITS PRODUCTION

This application is a continuation-in-part of U.S. application Ser. No. 08/052,951, filed Apr. 23, 1993, pending.

FIELD OF THE INVENTION

The present invention relates to building panels which are used on residential and manufactured home exteriors. More specifically, the invention relates to a laminated panel having facing sheets mechanically joined to a foamed core by fibrous material.

BACKGROUND OF THE INVENTION

Numerous laminated building panels are known in the prior art. The panels are frequently called appearance panels because they are typically embossed with attractive, simulated wood grain patterns and grooves to simulate wood paneling. There is a need to provide inexpensive laminated panels, for exterior surfaces, having improved resistance to delamination of the facing sheets and improved manufacturability. The latter improvement is deskable in order to avoid or at least minimize the formation of bubbles or blisters between the facing sheets and foam core during manufacturing of the panels or during weathering of the panels.

Glass fibers are known in the prior art as high strength and relatively inexpensive reinforcing materials. Consequently, some workers have suggested the deskability of incorporating glass fibers into vinyl panels. For example, Rajewski U.S. Pat. No. 4,308,702 states that glass fibers may be used along with other conventional filler material such as additives, pigments, etc., in rigid plastic building panels produced by profile extrusion of polyvinyl chloride (PVC) and other thermoplastic polymers. Wallen U.S. Pat. No. 5,030,676 suggests a process in which an unplasticized polyvinyl chloride composition can be extrusion coated on a variety of preformed stock materials such as wood, aluminum, glass fibers and the like.

It is also known to form a reinforced plastic laminate structure comprising an elongated reinforcing material such as fiberglass that is encapsulated in extruded plastic material as disclosed by Kohl U.S. Pat. No. 4,788,088.

Hanusa U.S. Pat. No. 4,753,837 discloses a laminated building panel having facing material adhered to one or both faces of a rigid foam core. That patent discloses a three dimensional open mesh structure such as fibers, strands, filaments, or strips of metal, glass, plastic or natural fibers which are either attached to or an integral part of the inside surface of the facing material.

Rothman U.S. Pat. No. 4,078,348 discloses construction panels for structural support systems which include an insulating core with face members made of thermoplastic or thermoset resin reinforced with glass fibers. The glass fibers are incorporated in multidirectional orientation in the resin by applying the fibers onto a layer which has previously been applied to a mold.

It is a principal objective of the present invention to provide a laminated building panel having an outer facing sheet and a foam core and having improved resistance to delamination of the facing sheet and reduced formation of bubbles during manufacture of the panel and reduced blistering of the facing sheet as a result of weathering.

Another objective of the invention is to provide an economical, environmentally acceptable method for producing a laminated building panel.

Additional objectives and advantages of our invention will become apparent to persons skilled in the art from the following detailed description and drawings.

SUMMARY OF THE INVENTION

In accordance with the present invention, there is provided a building panel comprising plastic facing sheets on one or both faces of a rigid foam core with fibrous glass fiber mat material mechanically connecting the facing sheet to the core. A typical facing sheet has a fibrous mat embedded in it immediately after the sheet is extruded and still molten so that the plastic web and the mat are fused into a unitary facing sheet. In a preferred embodiment, the facing sheets are about 20–30 mils thick and the glass fiber mat comprises about 8–12 wt. % of the facing sheet, preferably about 0.10 wt. %. In one preferred embodiment, the plastic web weighs about 15.83 lbs/ft$^2$ and the glass weighs about 1.65 lbs/ft$^2$. The rigid foam core may be made of polyurethane, isocyanate or other foamable synthetic material which acts as an insulator and provides structural rigidity to the panel. The core may be about ½ to 4 or more inches thick. The inner facing sheet on the back side of the panel (the side that will face toward the interior of a building) may have a glass mat on both surfaces in order to join the sheet to the foam core and also provide exposed fibers for adhesively bonding the panel to studs or other supporting means.

The glass fiber mat of the invention may be manufactured with wet-forming equipment in which wetted, randomly oriented glass fibers are formed into a mat in the presence of a binder. The glass fiber mat may have a weight of about 1–3 lb/100 ft$^2$, preferably about 1.65 lb/100 ft$^2$, depending upon the desired mechanical connection between the facing sheet and the foam core. The glass fiber diameter ranges between about 8 and 20 microns. The randomly oriented glass fibers may be relatively short, having an average length of about 1–6 cm. An organic resin binder is used in forming the glass fiber mat. In a particularly preferred panel, the organic resin in the binder is a polymer compatible with the polymers in the facing sheets. A particularly preferred organic binder is a cross-linked styrene-butadiene-acrylate copolymer. This binder permits the glass fibers to be wetted by the polymer which forms the facing sheets so the fibers will be securely held in the facing sheets when the polymer solidifies.

Alternatively, a woven glass fiber mat may be utilized. Woven mats are stronger than mats made with randomly oriented fibers, but they are more expensive and add little, if any, increased adherence between a facing sheet and core.

The manufacturing process of the invention will generate some scrap facing sheet material. We have found that such scrap material can be comminuted to form particles of reclaim material comprising glass fibers, binder, polymer and pigment. Such particles have an average size of less than about 2 mm, preferably less than about 1 mm and optimally about 200–500 microns.

The comminuted reclaim material may be blended with the starting materials. Reclaim material is preferably blended with the polymer used in one of the facing sheets (preferably the inner sheet) or may be blended with glass fibers and the binder to form a glass fiber mat suitable for making the building panel. Such reclaim material may comprise about 1–1.6 wt. % of the glass fiber mat, usually about 5–10 wt. %.

The facing sheets of the building panel are formed from suitable thermoplastic polymers. Some useful thermoplastic polymers include polyvinyl chloride (PVC), polyolefins (e.g., polypropylene or polyethylene), polycarbonates, acrylics, polyvinyl fluorides, acrylonitrile-butadiene-styrene copolymer (ABS) and other suitable thermoplastics. PVC is the preferred thermoplastic polymer for use in the outer facing sheet in the invention. Inexpensive scrap material, such as scrap ABS, may be used in the backside (inner) facing sheet since that sheet is not seen when installed on a building. Thus, the appearance of the inner sheet is not important.

The outer facing sheet may contain various other additives in addition to PVC. Such additives include various pigments or fillers, heat stabilizers, impact modifiers, processing aids and lubricants. Some suitable pigments and fillers are titanium dioxide, calcium carbonate, kaolin clay, silica and talc. The inner facing sheet may also contain additives such as fillers, heat stabilizers, processing aids and lubricants.

The heat stabilizer additives are preferably organotin compounds including the alkyl mercaptides, maleates and carboxylates. Some examples of suitable organotin stabilizers are dialkyltin allyl mercaptides, dibutyltin maleate, modified butyltin maleates, octyltin mercaptocarboxylic acids, dibutyltin dilaurate, and organotin derivatives of 2-mercaptoethanol. The organotin stabilizer preferably is present in a concentration of about 0.2–2 parts per 100 parts unplasticized polyvinyl chloride resin (0.2–2 phr). The impact modifiers may comprise chlorinated polyethylene, acrylic copolymers, acrylonitrile-butadiene-styrene resins and ethylene vinyl acetate copolymers. One suitable group of impact modifiers is sold by Rohm & Haas Company under the trademark ACRYLOID. The impact modifiers are typically employed at a level of about 0.4–10 phr.

One suitable processing aid is a low viscosity acrylic copolymer. Some useful lubricants include calcium, aluminum, zinc and magnesium stearates, and various waxes, soaps and fatty acid derivatives.

A method of forming a building panel in accordance with the invention comprises steps of extruding a molten polymer through an extrusion die to form a polymer layer, positioning a glass fiber mat adjacent the polymer layer, and then compressing the polymer layer and mat together before the polymer layer has solidified so that portions of the glass mat are embedded in the polymer and portions of the mat project from the polymer layer. Embossing rollers can be used to both compress and emboss the polymer layer. The assembled facing sheet is finally solidified by cooling.

The inner facing sheet is made in a similar fashion except that glass mats are preferably applied to both sides or faces of the polymer layer so that glass fibers project from both faces of the sheet. The inner facing sheet is preferably not embossed since it is not exposed when installed on a building.

In the manufacture of the facing sheets, the polymer layers are maintained at a temperature above the melting point of the polymer to facilitate flow of polymer into the glass mat. In a preferred panel made with polyvinyl chloride (PVC) in the outer facing sheet, the PVC should be no less than 25° F. above the melt temperature, preferably no less than about 50° F. above such temperature as it is compressed together with the mat.

When reclaim material is added to the glass fiber mat, the mat is heated to improve compatibility with the polymer layer. The mat is preferably heated by an electric radiant heater.

DETAILED DESCRIPTION OF A PREFERRED EMBODIMENT

As used herein, in describing a panel for application to a building, the terms outer and inner, exterior and interior, and outwardly and inwardly are used to mean directions toward the outside or inside of a building on which the panel is to be installed. Thus, an outer facing sheet is on the face of the panel which will be disposed toward the exterior of the building, and an inner facing sheet is on the face of the panel which will be disposed toward the interior of the building.

Figure 1:
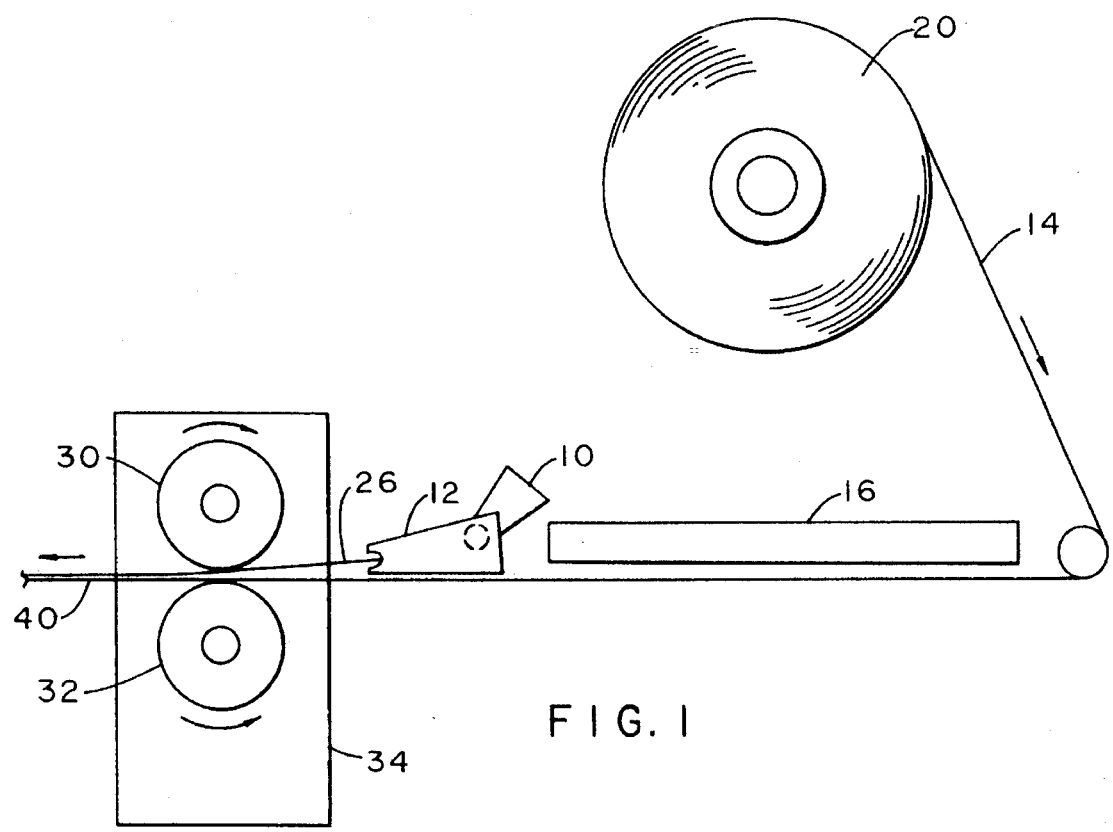
FIG. 1 is a schematic illustration of an apparatus and method for manufacturing a facing sheet for a building panel manufactured in accordance with the present invention.

There is schematically shown in FIG. 1 an apparatus 10 for manufacturing facing sheets for building panels made in accordance with the present invention. The apparatus includes an extruder 10 connected with a steel extrusion die 12, and a roll 20 for supplying a glass fiber mat 14. An electric radiant heater 16 may heat the mat 14. The heater is used especially when the glass fiber mat includes some reclaim material.

The extruder 10 may have a tapered conical screw with a maximum width of 62 mm. The extruder 10 is commercially available from American Maplan Corporation. Many different extruders of various designs can be used depending on the quantity and speed of extrudate that may be desired.

The extrusion die 12 extrudes a molten polymer web 26 comprising a sheet having a width equal to the width of the desired panel (approximately 4 feet for a typical building panel). The polymer web 26 may have a thickness of about 10–40 mils, and preferably about 20–30 mils depending on the application. The glass fiber mat 14 may have a width about the same as the width of the web 26 and is centered longitudinally so the edges of web 26 and mat 14 are aligned. Alternatively, the glass mat 14 may be about ½ inch wider than the web 26. The excess glass would then be removed after the facing sheet has been formed. The web 26 and glass fiber mat 14 are compressed between a steel embossing roll 30 and steel backup roll 32 supported by a roll stand 34. The backup roll 32 preferably has a mat (rough) finish to grip the glass fiber mat and pull it between the rolls.

Sufficient pressure must be applied by the two rolls against the polymer web for the glass fibers in mat 14 to be driven partially into web 26 to join the mat 14 and web 26 into a unitary facing sheet 40. The webs of material may travel at approximately 30–100 fpm, depending on the capacity of the extruder and width of the web being extruded, among other things.

The web 26 is preferably maintained at a temperature above the melting point of the polymer to facilitate flow of the polymer into the glass mat or glass fiber layer 14 so the web 26 and mat 14 will bond together into a unitary sheet with the glass embedded in the polymer. For PVC, the web 26 should be no less than 25° F. above the melt temperature of the PVC, and preferably no less than 50° F. above such melt temperature, as the web and glass mat are pressed against the web by the rolls 30 and 32. With a typical PVC blend, the blend temperature should be at least 300°–400° F. when web 26 and mat 14 are pressed together by the rolls 30, 32. The rolls 30, 32 are preferably water cooled so they will not become overheated as they press the webs into a unitary panel.

Figure 2:
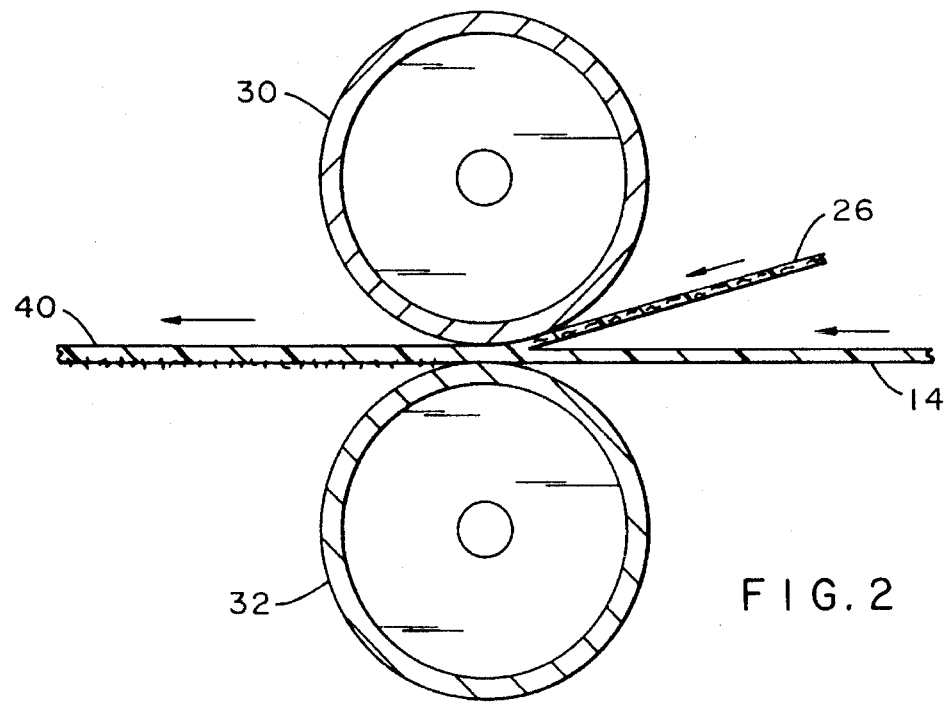
FIG. 2 is a side elevation view of the rolls of FIG. 1 in greater detail.
Figure 3:
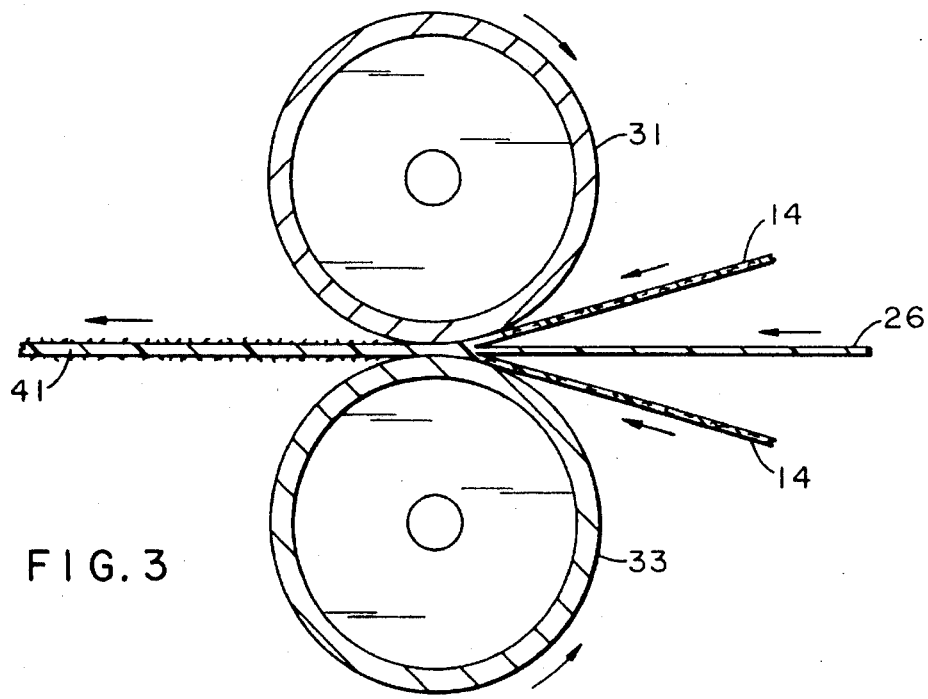
FIG. 3 is a side elevation view similar to FIG. 2, but showing fiberglass mats being pressed against both sides of a polymer web.

To produce a facing sheet having fiber glass embedded in both faces of the sheet, the apparatus of FIGS. 1 and 2 is modified as shown in FIG. 3 to feed fiberglass mats 14 on both sides of an extruder and then passing the three layers (glass/polymer/glass) between rolls 31, 33 for pressing the glass mats and polymer into a unit 41. In that apparatus, both rolls 31, 33 are preferably steel rolls with mat (rough) finishes to pull the glass mats 14 through the rolls. The facing sheet 41 with glass fibers in both faces is preferably used as the inner facing sheet on the building panel as is described below. Neither roll 31, 33 is an embossing roll because the inner facing sheet is not embossed.

Figure 4:
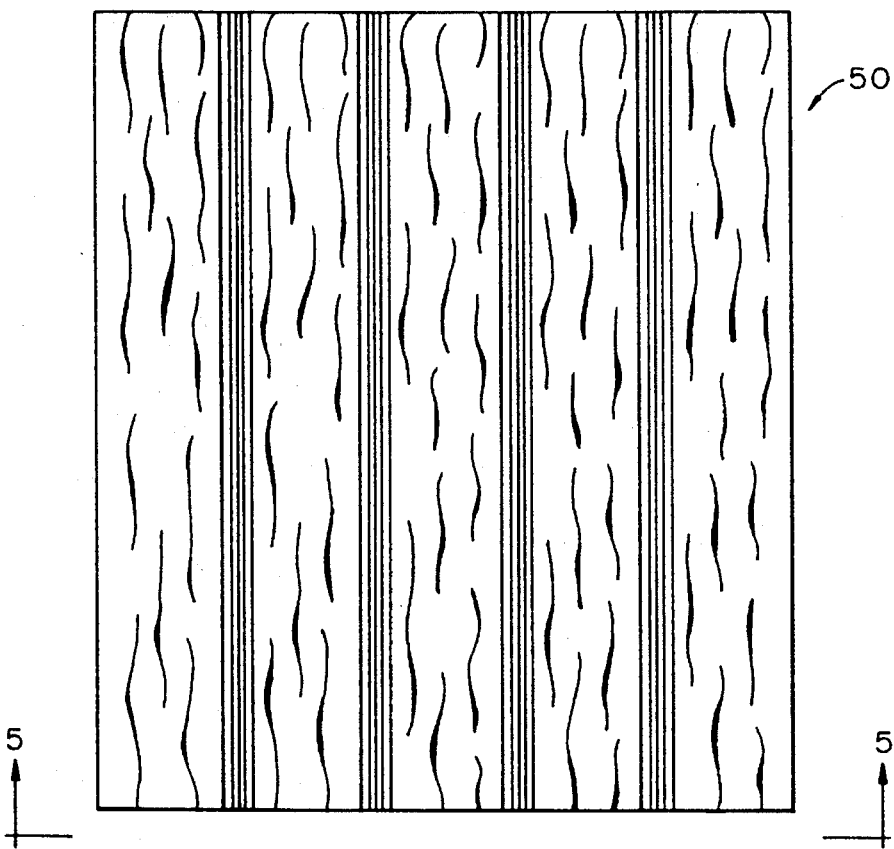
FIG. 4 is a plan view of a building panel constructed in accordance with the invention.
Figure 5:
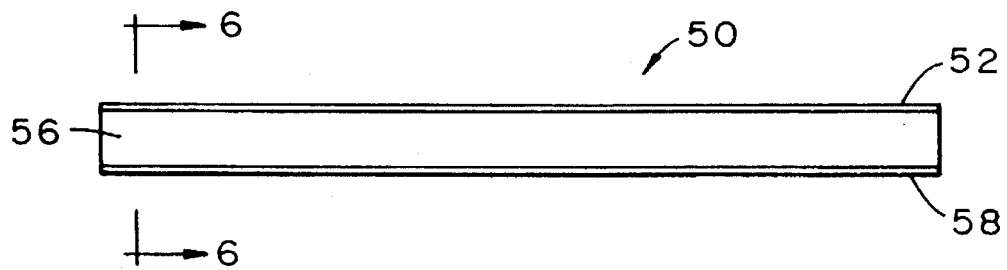
FIG. 5 is an end elevational view of the panel taken on line 5—5 of FIG. 4.
Figure 6:
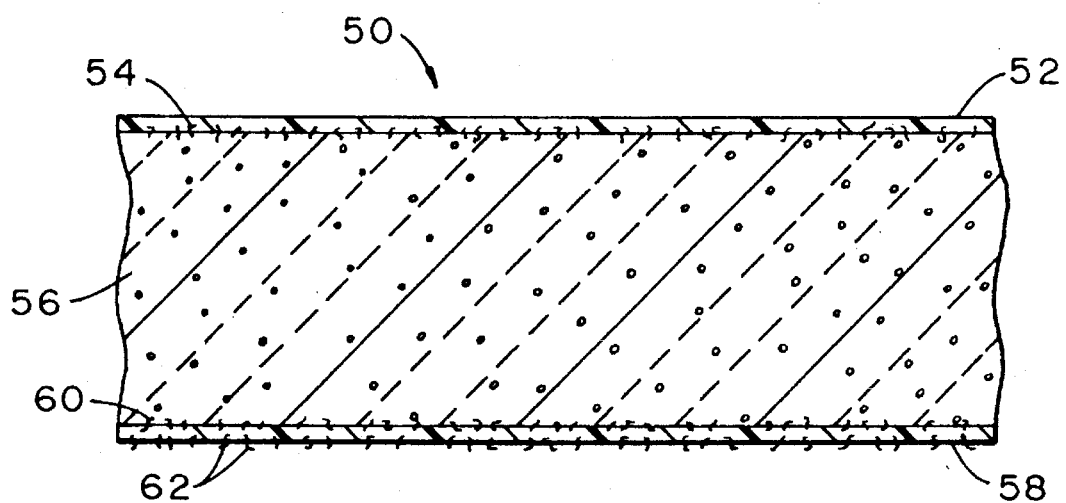
FIG. 6 is an enlarged, fragmentary, cross sectional view of a portion of the panel taken on line 6—6 of FIG. 4.

FIGS. 4, 5 and 6 show a preferred form of a building panel 50 of this invention. This type of panel is typically called an "appearance panel". The panels are typically 4 feet by 8 feet and may be about ½ inch to 4 inches thick depending on the application.

A preferred panel of this invention includes an outer facing sheet 52 made principally of polyvinyl chloride (PVC) with glass fibers 54 embedded in its interior face and projecting from such face into the rigid foamed core 56 (FIG. 6). The glass fibers 54 mechanically join the facing sheet 52 to the foamed core 56 without need for a separate adhesive. The foamed core 56 is preferably polyurethane or isocyanate similar to that disclosed in U.S. Pat. No. 4,753, 837, which disclosure is incorporated by reference into this application. However, the particular material of the foam core is not critical to this invention.

A preferred panel 50 of this invention further includes an inner facing sheet 58 on the interior face of the panel. The inner facing sheet 58 preferably has glass fibers 60, 62 embedded in and projecting from both of its faces (FIG. 4). The glass fibers 60 on the exterior face toward the foam core 56 project into the foam and are entrapped in such foam. The fibers 62 on the opposite (interior) face of the inner facing sheet 58 facilitate attachment of the panel to studs or other supporting structure (not shown) in a building as by adhesive bonding.

In the manufacture of the panel of FIGS. 4–6, a foamable plastic reaction mixture such as polyurethane or isocyanate is injected into a hollow space between inner and outer facing sheets using a foaming machine, as is well known in the art. The plastic reaction mixture flows around the glass fibers and wets them. The mixture is allowed to expand to fill the hollow space and to polymerize to form a rigid foam core between the facing sheets. The glass fibers projecting from the facing sheets into the foam, are entrapped in the foam, and bond the facing sheets to the rigid foam in a monolithic unit.

While the invention has been described in terms of preferred embodiments, the claims appended hereto are intended to encompass all embodiments which fall within the spirit of the invention. For example, the webs of PVC and glass could be pressed together between two continuous belts supported and driven by rollers over which the belts are mounted. The extruder shown in FIGS. 1 and 2 could also be placed below the path of the fiberglass mat and the rolls reversed with the top roll having a mat finish and the bottom roll being an embossing roll. The roll 30 could also be a smooth roll instead of an embossing roll. Fibers other than glass fibers can also be employed in the invention. For example, the fibers could be strands or filaments of plastic or natural materials.

What is claimed is:

1. A method of forming a building panel comprising:

extruding a molten polymer to form a molten web;

positioning a mat of fibrous material against said molten web;

pressing said mat against said molten web before the web has solidified so that the fibrous material in the mat is partially embedded in the web and partially projecting from a face of the web;

cooling the polymer to form an outer facing sheet;

applying a foamable plastic formulation against the face of said facing sheet having fibrous material projecting therefrom with said projecting fibrous material wetted by and contained in said formulation; and foaming and polymerizing said formulation to form a rigid foam layer mechanically bonded to said facing sheet by said fibrous material.

2. A method as set forth in claim 1 in which said mat is comprised of randomly oriented glass fibers.

3. A method as set forth in claim 1 in which said foamable plastic formulation comprises polyurethane or isocyanate.

4. A method as set forth in claim 1 which includes forming an inner polymer facing sheet having fibrous material partially embedded in the polymer and partially projecting from the polymer, positioning said inner facing sheet generally parallel to and spaced from said outer sheet, with faces of said sheets having fibrous material projecting therefrom facing one another, and foaming said plastic formulation to fill a space between the two facing sheets.

5. A method as set forth in claim 4 in which said inner facing sheet is formed with fibrous mat material projecting from its interior and exterior faces.

6. A method of forming a building panel comprising:

extruding a molten polymer to form a molten web having a thickness of about 10–40 mils;

positioning a mat of randomly oriented glass fibers having an average length in a range of about 1–6 cm against said web, said mat having a weight of about 1–3 lb/100 ft$^2$;

pressing said mat against said molten web before the web has solidified so that fibrous material in the mat is partially embedded in the web and partially projecting from a face of the web;

cooling the polymer to form an outer sheet;

applying a foamable plastic formulation against the face of said facing sheet having fibrous material projecting therefrom with the projecting fibrous material wetted by and contained in said formulation; and foaming and polymerizing said formulation to form a rigid foam layer mechanically bonded to said facing sheet by said fibrous material.

7. A method as set forth in claim 6 in which said molten web has a temperature in a range of about 300°–400° F. when said mat is pressed against the molten web.

8. A method as set forth in claim 6 in which said foamable plastic formulation comprises polyurethane or isocyanate.

9. A method as set forth in claim 6 in which the glass fibers in said mat have organic binder on them which is compatible with said extruded polymer.

10. A method as set forth in claim 6 which includes forming an inner polymer facing sheet comprising polymer and fibrous material partially embedded in the polymer and projecting from the polymer, positioning said inner facing sheet generally parallel to and spaced from said outer facing sheet, with a face of said inner sheet having fibrous material projecting therefrom facing said outer facing sheet, and foaming said plastic formulation to fill a space between the inner and outer facing sheets.

11. A method of forming a building panel comprising:

extruding a molten thermoplastic polymer to form a molten web having a thickness of about 20–30 mils;

positioning a wet formed mat of randomly oriented glass fibers having an average length of about 1–6 cm against said web;

moving the web and said mat between rotating rolls, while maintaining said molten web above its melting point, to press said mat against said web so that fibrous material in the mat is partially embedded in the web and partially projecting from a face of the web;

cooling the polymer to form an outer, facing sheet;

positioning an inner facing sheet having a thickness of about 20–30 mils and comprising polymer and fibrous material partially embedded in the polymer and partially projecting from the polymer generally parallel to and spaced from said outer sheet, with faces of said inner and outer sheets having fibrous material projecting therefrom facing one another;

applying a foamable polyurethane or isocyanate formulation between said inner and outer facing sheets; and foaming and polymerizing said formulation to form a rigid foam layer mechanically bonded to said facing sheets by said fibrous material.

12. A method as set forth in claim 11 in which inner facing sheet has glass fibers embedded in and projecting from both faces thereof.

13. A method as set forth in claim 11 in which said molten web is maintained at least 25° F. above its melting point as it is compressed against said mat.

14. A method as set forth in claim 11 in which said rotating rolls comprise an embossing roll for contacting and embossing said molten web and a backup roll for contacting said mat.

15. A method as set forth in claim 14 in which said molten polymer comprises polyvinyl chloride resin.

* * * * *